US011449514B2

(12) United States Patent
Pilkington et al.

(10) Patent No.: US 11,449,514 B2
(45) Date of Patent: Sep. 20, 2022

(54) APPROXIMATE AGGREGATION QUERIES

(71) Applicant: INTERSET SOFTWARE INC., Santa Clara, CA (US)

(72) Inventors: Shaun Pilkington, Ottawa (CA); Stephan F. Jou, Santa Clara, CA (US); Ross Diener, Santa Clara, CA (US)

(73) Assignee: Interset Software LLC, Santa Clara, CA (US)

( * ) Notice: Subject to any disclaimer, the term of this patent is extended or adjusted under 35 U.S.C. 154(b) by 182 days.

(21) Appl. No.: 16/728,425

(22) Filed: Dec. 27, 2019

(65) Prior Publication Data

US 2021/0200773 A1 Jul. 1, 2021

(51) Int. Cl.
G06F 16/2457 (2019.01)
G06F 7/58 (2006.01)

(52) U.S. Cl.
CPC .......... *G06F 16/24575* (2019.01); *G06F 7/58* (2013.01)

(58) Field of Classification Search
CPC .............................. G06F 16/24575; G06F 7/58
See application file for complete search history.

(56) References Cited

U.S. PATENT DOCUMENTS

| 8,868,470 B2 | 10/2014 | Xu et al. |
| 9,082,127 B2 | 7/2015 | Hsieh et al. |
| 2004/0128290 A1* | 7/2004 | Haas ................. G06F 16/24556 |

FOREIGN PATENT DOCUMENTS

| CN | 110147357 A | 8/2019 |
| CN | 110297858 A | 10/2019 |
| WO | WO-WO2014177181 A1 | 11/2014 |

OTHER PUBLICATIONS

Bolin Ding et al., Sample + Seek: Approximating Aggregates with Distribution Precision Guarantee, SIGMOD'16, Jun. 26-Jul. 1, 2016, San Francisco, CA, USA (Year: 2016).*
Guangxuan Song, et al., "Approximate Calculation of Window Aggregate Functions Via Global Random Sample," Mar. 2018, vol. 3, Issue 1, 22 pages total.
Bolin Ding, et al., "Sample + Seek: Approximating Aggregates With Distribution Precision Guarantee," SIGMOD'16, Jun. 26-Jul. 1, 2016, 16 pages total.

* cited by examiner

*Primary Examiner* — Anhtai V Tran
*Assistant Examiner* — Xiaoqin Hu
(74) *Attorney, Agent, or Firm* — Sheridan Ross P.C.

(57) ABSTRACT

A computing device includes a processor and a medium storing instructions. The instructions are executable by the processor to: receive a database query for an approximate aggregation of a numerical value of a plurality of records, wherein each record includes the numerical value and a filter value; in response to the database query, determine a count of records that have filter values within an importance threshold associated with the database query; and determine the approximate aggregation of the numerical value based on the count of records and the importance threshold associated with the database query.

14 Claims, 8 Drawing Sheets

APPROXIMATE AGGREGATION QUERIES

BACKGROUND

Some computer systems collect data in databases. The collected data may include text documents, audio files, webpages, images, video files, and so forth. The collected data may be stored and retrieved using a computer program such as a database management system (DBMS). One type of database is a relational database, which stores information in tables. The data stored in databases may be retrieved by queries composed in a specialized query language, such as Structured Query Language (SQL).

BRIEF DESCRIPTION OF THE DRAWINGS

Some implementations are described with respect to the following figures.

DETAILED DESCRIPTION

Some database queries may generate a result based on an actual or exact aggregation of stored data. For example, in the SQL query language, a SUM query may sum numerical values across a set of multiple records to generate an actual or exact sum value. In contrast, other types of data queries (referred to herein as "approximate aggregation queries") may return an estimated value that is generated without actually aggregating each record of the set. For example, some conventional techniques of approximate aggregation may perform a random sample of a sub-portion of the set of records, and estimate a sum value based on the random sample. However, some data sets can have their values distributed in a way that makes conventional techniques of approximate aggregation ineffective. For example, some datasets can be "heavy tailed," such that there are values in a narrow portion of the sample range that have a large effect on the aggregate. Therefore, if a random sampling misses the heavy tailed values, such sampling can result in an excessive error in the approximate aggregation query. Accordingly, in order to reduce or eliminate such errors, a conventional technique may have to increase the number of sampled values, therefore resulting in a relatively slower execution time of an approximate aggregation query.

As described further below with reference to FIGS. 1-7, some implementations may provide an improved technique for performing approximate aggregation queries. In some implementations, each data record may include a field that is pre-populated with a filter value that indicates the importance of that record with respect to a particular type of approximate aggregation query (e.g., an approximate sum query, an approximate product query, an approximate variance query, and so forth). In some examples, the filter value may be calculated by dividing a random number by a numerical value to be aggregated (e.g., in another field of the record). Subsequently, when an approximate aggregation query is received (e.g., an approximate sum query), a query engine may count the number of records that have filter values less than or equal to an importance threshold, and may calculate the approximate aggregation of the numerical value by dividing the count of records by the importance threshold. In some examples, the importance threshold may be increased to decrease the error of the approximation to a desired level. In this manner, the processing time required to execute an approximate aggregation query may be reduced in comparison to conventional techniques. Further, the approximate aggregation query may avoid errors due to "heavy tailed" or other non-uniform distributions, and may thus provide improved accuracy in comparison to conventional techniques.

Figure 1:
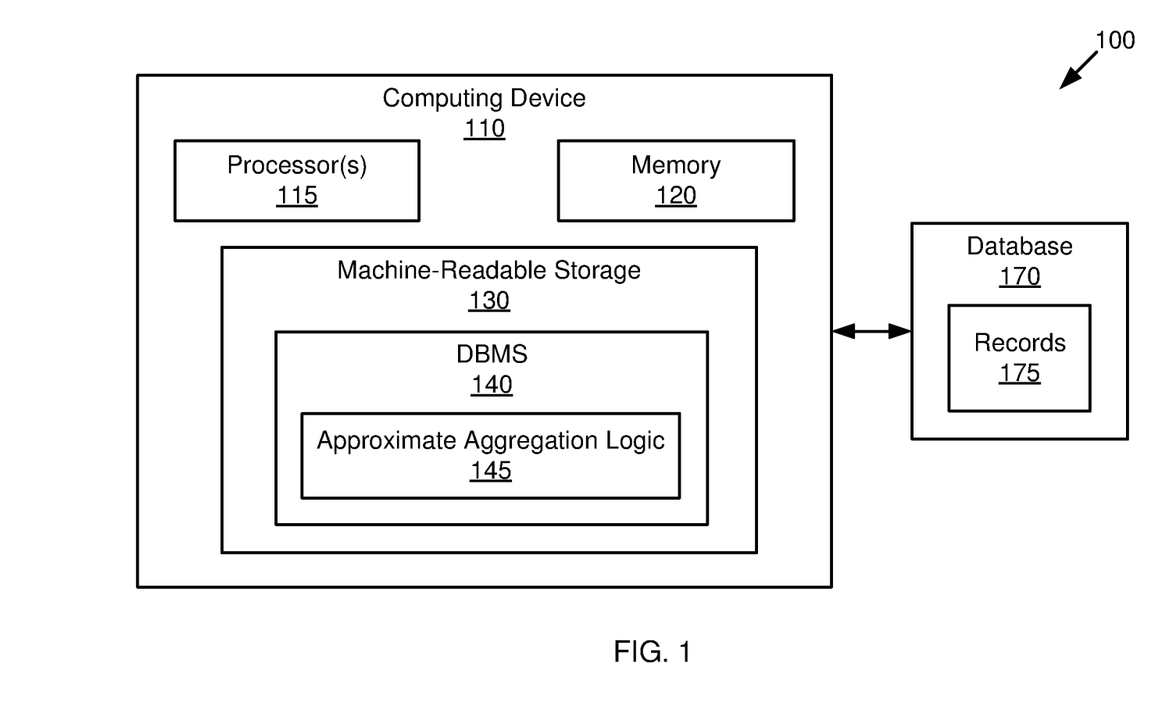
FIG. 1 is a schematic diagram of an example system, in accordance with some implementations.

FIG. 1 shows a schematic diagram of an example system 100, in accordance with some implementations. As shown, in some implementations, the system 100 may include a computing device 110 and a database 170. The computing device 100 may be, for example, a computer, a portable device, a server, a network device, an appliance, a communication device, etc. In other examples, the computing device 110 may be a server rack system including multiple computing modules (e.g., blade servers), networking devices, storage devices, power supply components, and so forth. Further, in yet other examples, the computing device 110 may be a computing cluster, a datacenter, a distributed system, and so forth.

In some implementations, the computing device 110 may include processor(s) 115, memory 120, and machine-readable storage 130. The processor(s) 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random-access memory (DRAM), static random-access memory (SRAM), etc.).

In some implementations, the machine-readable storage 130 can include non-transitory storage media such as hard drives, flash storage, optical disks, etc. As shown, the machine-readable storage 130 may store a database management system (DBMS) 140 including approximate aggregation logic 145. In some examples, the DBMS 140 may be implemented in executable instructions stored in the machine-readable storage 130 (e.g., software and/or firmware). However, the DBMS 140 and/or the approximate aggregation logic 145 may be implemented in any suitable manner. For example, some or all of the DBMS 140 and/or the approximate aggregation logic 145 could be hard-coded as circuitry included in the processor(s) 115 and/or the computing device 110. In other examples, some or all of the DBMS 140 and/or the approximate aggregation logic 145 could be implemented on a remote computer (not shown), as web services, and so forth. In another example, the DBMS 140 and/or the approximate aggregation logic 145 may be implemented in one or more controllers of the computing device 110.

The DBMS 140 may be a software application including functionality to configure and interact with the database 170. For example, the DBMS 140 may allow users to specify tables to organize records 175 of the database 170. Further, the DBMS 140 may allow users or other applications to perform queries to modify or retrieve the records 175 of the database 170. For example, the DBMS 140 may receive a database query via a network from a remote computing device (not shown), may execute the query, and may return the query results to the remote computing device via the network. In some examples, the DBMS 140 may include a query engine (not shown in FIG. 1) implemented in software, hardware, or a combination thereof.

The DBMS 140 may use the approximate aggregation logic 145 to execute approximate aggregation queries in accordance with one or more implementations. In some examples, the DBMS 140 may pre-populate the records 175 for subsequent execution of approximate aggregation queries. For example, the approximate aggregation logic 145 may add one or more fields to each record 175, and may populate the added field(s) with generated values that are dedicated for executing approximate aggregation queries (referred to herein as "filter values"). The filter value of each record 175 may be generated by dividing a random number by a numerical value that indicates the relative importance of that particular record 175 with respect to a particular type of approximate aggregation query. Subsequently, when an approximate aggregation query is received, the approximate aggregation logic 145 may count the number of records 175 that have filter values less than or equal to an importance threshold. The approximate aggregation logic 145 may then calculate the approximate aggregation of the numerical value by dividing the count of records by the importance threshold. The functionality of the approximate aggregation logic 145 is described further below with reference to FIGS. 2A-7, which show various non-limiting examples.

Figure 2A:
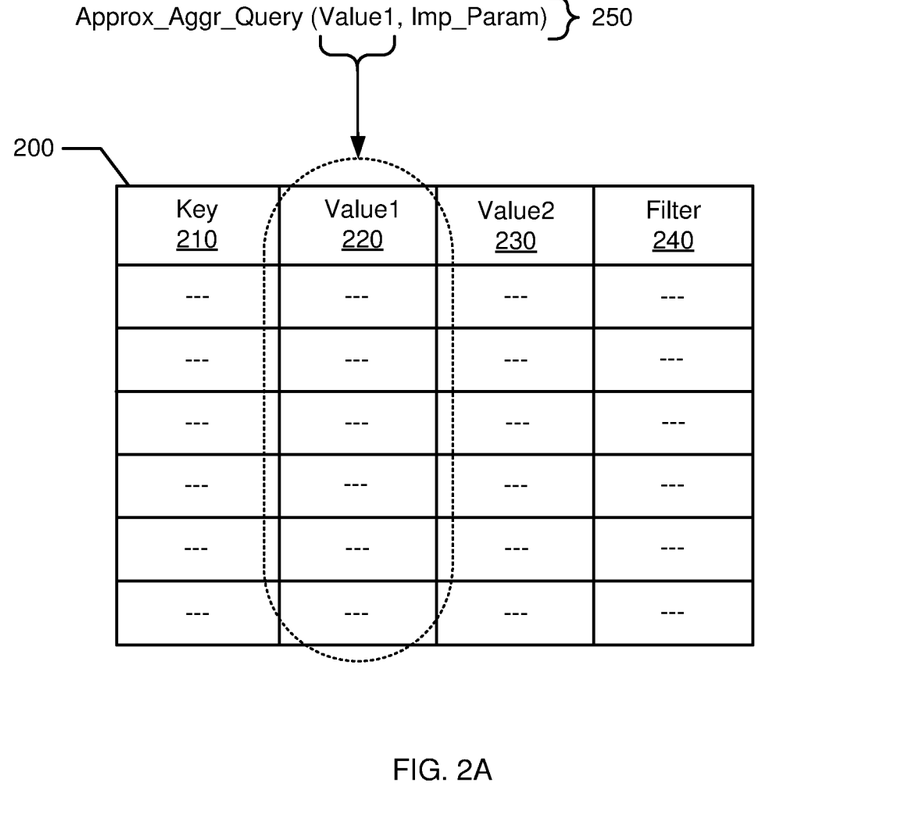
FIGS. 2A-2B are illustrations of example data structures, in accordance with some implementations.

Referring now to FIG. 2A, shown is an example data table 200 in accordance with one or more implementations. The example data table 200 may include multiple records (illustrated as rows) that each include four fields, namely "Key" field 210, "Value1" field 220, "Value2" field 230, and "Filter" field 240. In some implementations, the "Filter" field 240 of each record may be pre-populated with a filter value before receiving an approximate aggregation query. In some examples, the filter value may be calculated by dividing a random number by a numerical value indicating the importance of that record with respect to a particular type of approximate aggregation query (e.g., an approximate sum query, an approximate mean query, an approximate variance query, and so forth). Further, in some examples, generating a filter value may optionally include calculating the logarithm of the division result, and converting the logarithm result to a byte data type. Optionally, in some examples, the table 200 may be indexed according to the "Filter" field 240. Note that the data table 200 is provided for the sake of illustration, and other implementations are possible.

As shown in FIG. 2A, an approximate aggregation query 250 may be received (e.g., by the DBMS 140 shown in FIG. 1) for an estimated aggregation value of numerical values in the "Value1" field 220 across multiple records of the table 200. In some implementations, the approximate aggregation query 250 may be a single query that includes a condition to limit the set of records being aggregated. For example, the approximate aggregation query 250 may request an estimated sum of the numerical values in the "Value1" field 220 (represented by a dotted line in FIG. 2A) for all records that have values in the "Value2" field 230 that are greater than five. Further, in some implementations, the approximate aggregation query 250 may include an "Imp_Param" parameter. In some examples, the "Imp_Param" parameter may specify an importance threshold associated with the approximate aggregation query 250. In other examples, the "Imp_Param" parameter may specify the level of error (referred to herein as "error rate") that is tolerable in the approximation aggregation. For example, an error rate of "0.01" may indicate that an error level of one percent can be tolerated in the results of the approximate aggregation query 250. The importance threshold may vary in an inverse relationship to the error rate. Accordingly, in some examples, the importance threshold can be calculated from the specified error rate according to a predefined inverse relationship.

In one or more implementations, executing the approximate aggregation query 250 may include counting the number of records of the table 200 that have filter values within an importance threshold. For example, referring now to FIG. 2B, executing the approximate aggregation query 250 may include counting the number of records of the table 200 that have values in the "Filter" field 240 that are less than or equal to an importance threshold (e.g., specified in the "Imp_Param" parameter shown in FIG. 2A). Further, in some examples, the "Query Result" may calculated by dividing the count of records by the importance threshold.

Figure 2B:
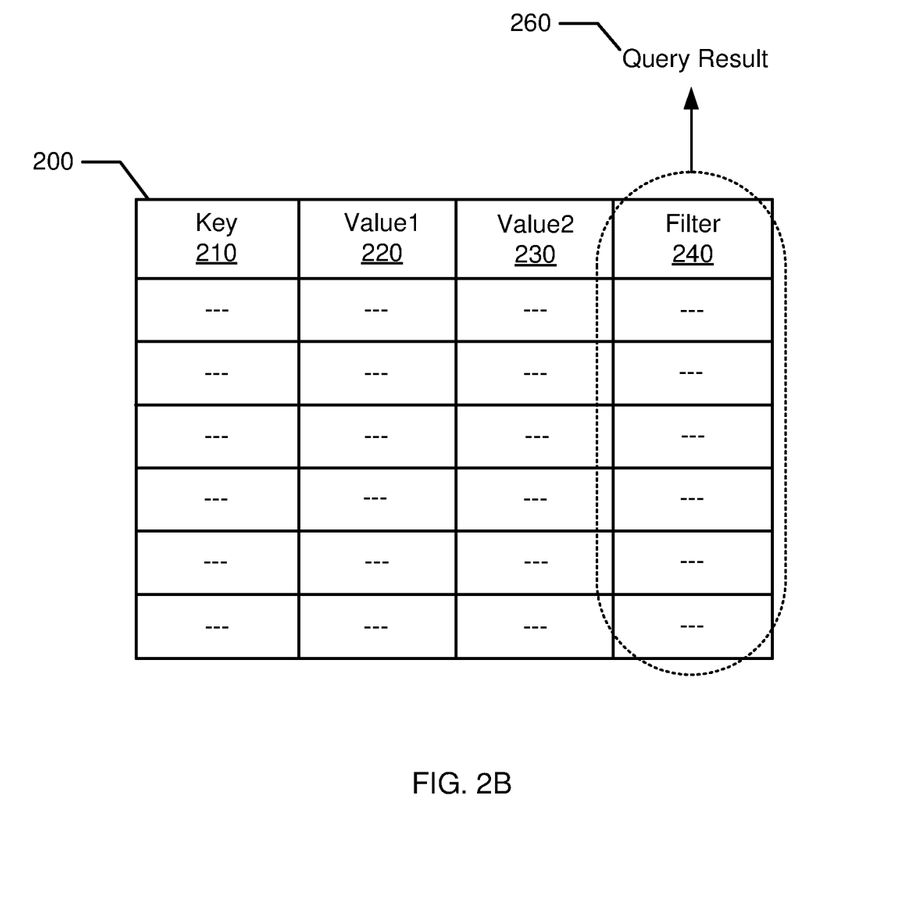

Note that, while FIGS. 2A-2B shows a single "Filter" field 240, implementations are not limited in this regard. For example, each record of table 200 may have multiple filter fields that correspond to different types of approximate aggregation queries (e.g., an approximate sum query, an approximate variance query, an approximate product query, etc.). In some implementations, the calculation of a filter value in field 240 may depend on the type of approximate aggregation that corresponds to the "Filter" field 240. For example, if the "Filter" field 240 is to be used for approximate sum queries of the "Value1" field 220, the filter value of a particular record may be calculated by generating a random number, and dividing the random number by the numerical value in the "Value1" field 220 for that record.

In another example, if the "Filter" field 240 is to be used for approximate variance queries of the "Value1" field 220, the filter value may be determined by computing the square of the numerical value in the "Value1" field 220 and dividing a random number by the square for that record. In yet another example, if the "Filter" field 240 is to be used for approximate product queries of the "Value1" field 220, the filter value may be determined by computing the logarithm of the numerical value in the "Value1" field 220 and dividing a random number by the logarithm for that record.

Note that, while FIG. 2A shows the importance threshold as specified by a parameter in the query 250, implementations are not limited in this regard. For example, the importance threshold may be specified in a configuration setting of the DBMS 140, in a user setting, and so forth. Further, in some examples, the importance threshold may be calculated based on an error rate parameter included in the query 250, based on an error rate specified in a configuration setting, and so forth. Note also that, in the example discussed above with reference to FIG. 2B, the term "within an importance threshold" refers to a filter value that is less than or equal to the importance threshold. However, implementations are not limited in this regard. For example, for other implementations may count filter values that are less than a threshold. Further, in other implementations, each filter value may correspond to an inverse of the importance of the numerical value, and therefore executing an approximate aggregation query may include counting the records that have filter values that are greater than the threshold, or are greater than or equal to a threshold. Further, other variations are possible.

Figure 3:
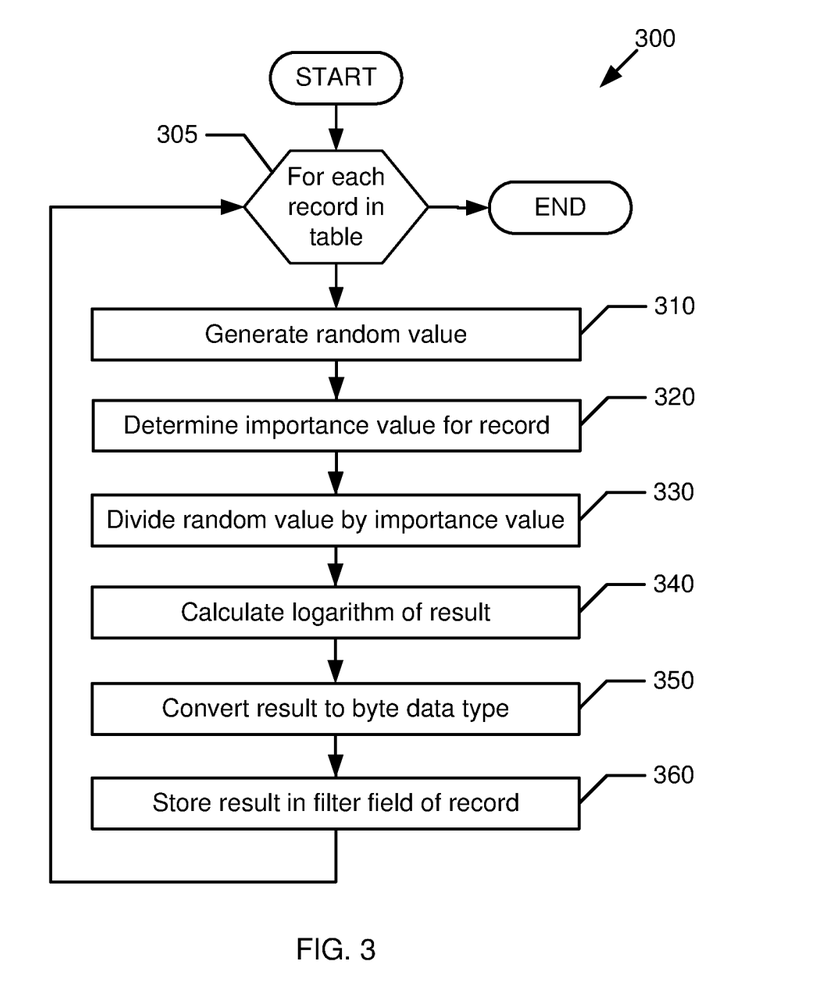
FIG. 3 is a flow diagram of an example process for pre-populating filter values, in accordance with some implementations.

Referring now to FIG. 3, shown is an example process 300 for pre-populating filter values, in accordance with some implementations. In some examples, the process 300 may be performed by some or all of the DBMS 140 and/or the approximate aggregation logic 145 shown in FIG. 1. The process 300 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1 and 2A, which show examples in accordance with some implementations. However, other implementations are also possible.

Block 305 may enter a loop (including blocks 310 to 360) to process each record in a database table. For example, referring to FIGS. 1-2A, the DBMS 140 and/or the approximate aggregation logic 145 may add the "Filter" field 240 to each record of the table 200, and may initiate a loop to populate the filter value in the "Filter" field 240 of each record.

Block 310 may include generating a random value. For example, referring to FIGS. 1-2A, the approximate aggregation logic 145 may generate a random value between 0 and 1 (e.g., 0.433).

Block 320 may include determining an importance value for the record. For example, referring to FIGS. 1-2A, the approximate aggregation logic 145 may determine that the "Filter" field 240 is associated with approximate sum queries of the "Value1" field 220, and may thus determine that the importance value is the numerical value in the "Value1" field 220 for that record.

In some implementations, the determination of the importance value (at block 320) may depend on the type of approximate aggregation associated with the filter value. For example, if the "Filter" field 240 is associated with approximate sum queries of the "Value1" field 220, the importance value is the numerical value in the "Value1" field 220. In another example, if the "Filter" field 240 is associated with approximate variance queries of the "Value1" field 220, the importance value may be determined by computing the square of the numerical value in the "Value1" field 220 and dividing a random number by the square for that record. In yet another example, if the "Filter" field 240 is associated with approximate product queries of the "Value1" field 220, the importance value may be determined by computing the logarithm of the numerical value in the "Value1" field 220 and dividing a random number by the logarithm for that record.

Block 330 may include dividing the random number by the importance value. For example, referring to FIGS. 1-2A, the approximate aggregation logic 145 may divide the random number for the record (generated at block 310) by the importance value for the record (determined at block 320).

Block 340 may include calculating the logarithm of the result of block 330. Block 350 may include converting the result of block 340 to a byte data type. Block 360 may include storing the result of block 350 in a filter field of the record. For example, referring to FIGS. 1-2A, the approximate aggregation logic 145 may calculate the logarithm of the result of dividing the random number by the importance value, may convert the logarithm value to a byte data type (e.g., an 8-bit integer data type), and may store the converted logarithm value in the "Filter" field 240 of the record. In some implementations, applying a logarithm function may expand the range of the filter values, and may thereby allow the filter values to reflect a narrow range of numeric values that have relatively high importance (e.g., as present in a "heavy tailed" distribution). Further, using a byte data type may provide enough importance levels (e.g., 256 levels) to distinguish such a narrow range of numeric values, while not requiring relatively large amounts of memory to store the filter values.

After block 360, the process 300 may return to block 305 to process the next record in the table (i.e., to pre-populate the filter field of the next record). Once all records in the table are processed, the process 300 may be completed. Optionally, after pre-populating the filter fields of all records, the table may be indexed according to the filter field (not shown in FIG. 3). Note that process 300 is provided as an example, and other implementations are possible. For example, block 340 and/or block 350 may be omitted in some implementations.

Figure 4:
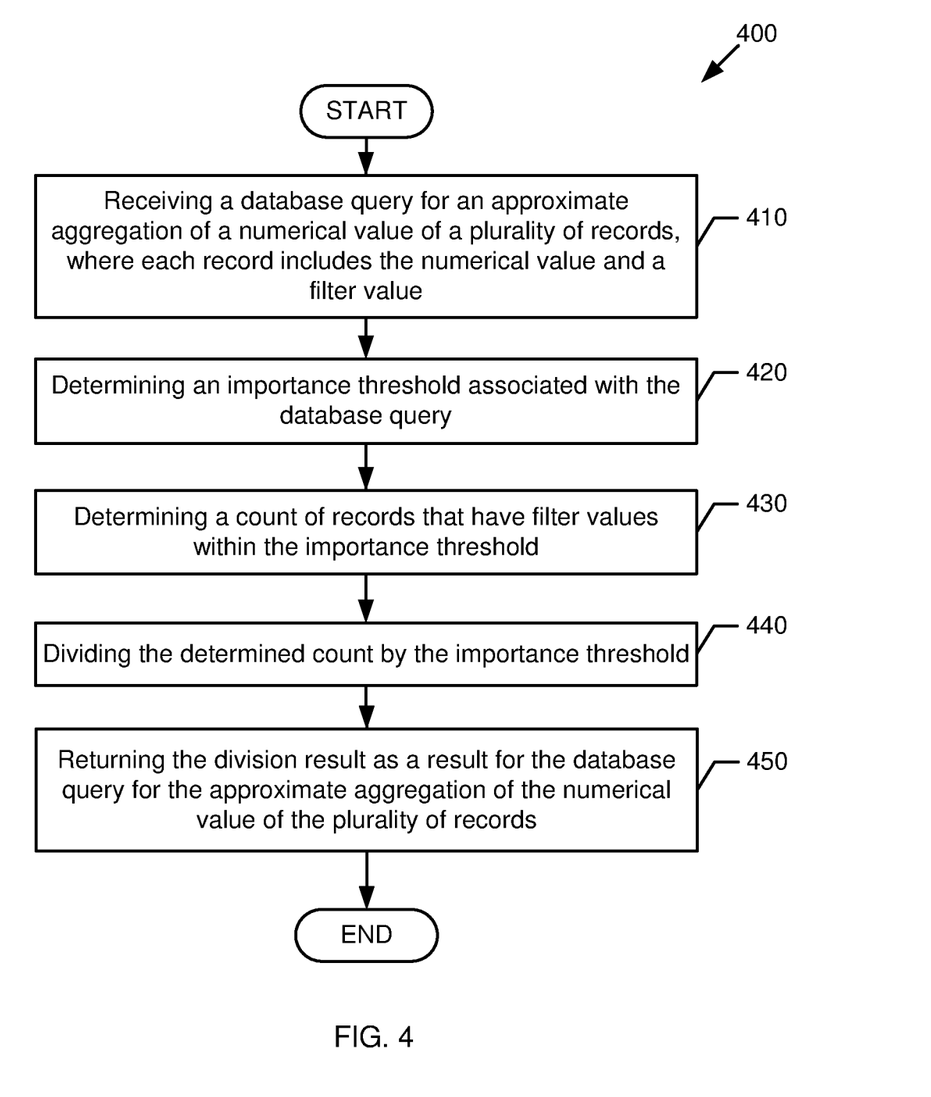
FIG. 4 is a flow diagram of an example process for performing approximate aggregation queries, in accordance with some implementations.

Referring now to FIG. 4, shown is an example process 400 for performing approximate aggregation queries, in accordance with some implementations. In some examples, the process 400 may be performed by some or all of the DBMS 140 and/or the approximate aggregation logic 145 shown in FIG. 1. The process may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1 and 2A-2B, which show examples in accordance with some implementations. However, other implementations are also possible.

Block 410 may include receiving a database query for an approximate aggregation of a numerical value of a plurality of records, where each record includes the numerical value and a filter value. For example, referring to FIGS. 1-2B, the DBMS 140 may receive the approximate aggregation query 250 to perform an estimated sum of numerical values in the "Value1" field 220 across multiple records of the table 200. Each record of the table 200 may include a "Filter" field 240 that stores a filter value for that record. In some examples, the filter values may be pre-populated prior to receiving the approximate aggregation query 250 (e.g., using the process 300 shown in FIG. 3).

Block 420 may include determining an importance threshold associated with the database query. For example, referring to FIGS. 1-2B, the approximate aggregation logic 145 may determine the importance threshold from a parameter included in the approximate aggregation query 250. In other examples, the approximate aggregation logic 145 may determine the importance threshold from a configuration setting of the DBMS 140, from a register, and so forth.

Block 430 may include determining a count of the records that have filter values within the importance threshold. For example, referring to FIGS. 1-2B, the approximate aggregation logic 145 may count the number of records of the table 200 that have values in the "Filter" field 240 that are less than or equal to the importance threshold (determined at block 420).

Block 440 may include dividing the determined count by the importance threshold. For example, referring to FIGS. 1-2B, the approximate aggregation logic 145 may divide the count of records (determined at block 430) by the importance threshold (determined at block 420).

Block 450 may include returning the division result as a result for the database query for the approximate aggregation of the numerical value of the plurality of records. For example, referring to FIGS. 1-2B, the approximate aggregation logic 145 may provide the division result (from block 440) as the query result 260 for the approximate aggregation query 250. After block 450, the process 400 is completed.

Optionally, in some implementations, a filter value is calculated as a logarithm prior to being stored in the filter field (e.g., as in block 340 shown in FIG. 3). In such implementations, block 420 may include calculating the logarithm of the importance threshold, and block 430 may include determining a count of the records that have filter values less than or equal to the logarithm of the importance threshold.

Figure 5:
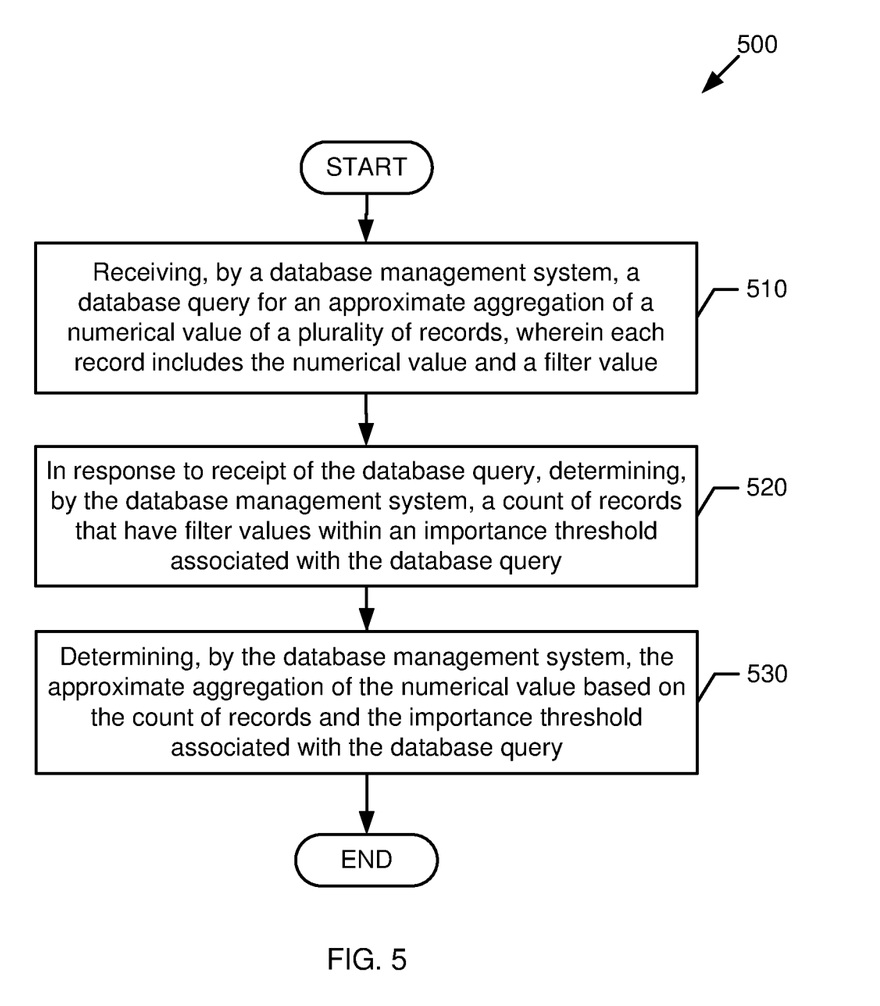
FIG. 5 is a flow diagram of an example process for performing approximate aggregation queries, in accordance with some implementations.

Referring now to FIG. 5, shown is an example process 500 for performing approximate aggregation queries, in accordance with some implementations. In some examples, the process 500 may be performed by some or all of the DBMS 140 and/or the approximate aggregation logic 145 shown in FIG. 1. The process 500 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 500 may be described below with reference to FIGS. 1 and 2A-2B, which show examples in accordance with some implementations. However, other implementations are also possible.

Block 510 may include receiving, by a database management system, a database query for an approximate aggregation of a numerical value of a plurality of records, wherein each record includes the numerical value and a filter value. For example, referring to FIGS. 1-2B, the DBMS 140 may receive the approximate aggregation query 250 to perform an estimated sum of numerical values in the "Value1" field 220 across multiple records of the table 200. Each record of the table 200 may include a "Filter" field 240 that stores a filter value for that record. In some examples, the filter values may be pre-populated prior to receiving the approximate aggregation query 250 (e.g., using the process 300 shown in FIG. 3).

Block 520 may include, in response to receipt of the database query, determining, by the database management system, a count of the records that have filter values within an importance threshold associated with the database query. For example, referring to FIGS. 1-2B, the approximate aggregation logic 145 may count the number of records of the table 200 that have values in the "Filter" field 240 that are less than or equal to an importance threshold specified in the approximate aggregation query 250.

Block 530 may include determining, by the database management system, the approximate aggregation of the numerical value based on the count of records and the importance threshold associated with the database query. For example, referring to FIGS. 1-2B, the approximate aggregation logic 145 may divide the count of records (determined at block 520) by the importance threshold, and may provide the division result as the query result 260 for the approximate aggregation query 250. After block 530, the process 500 is completed.

Figure 6:
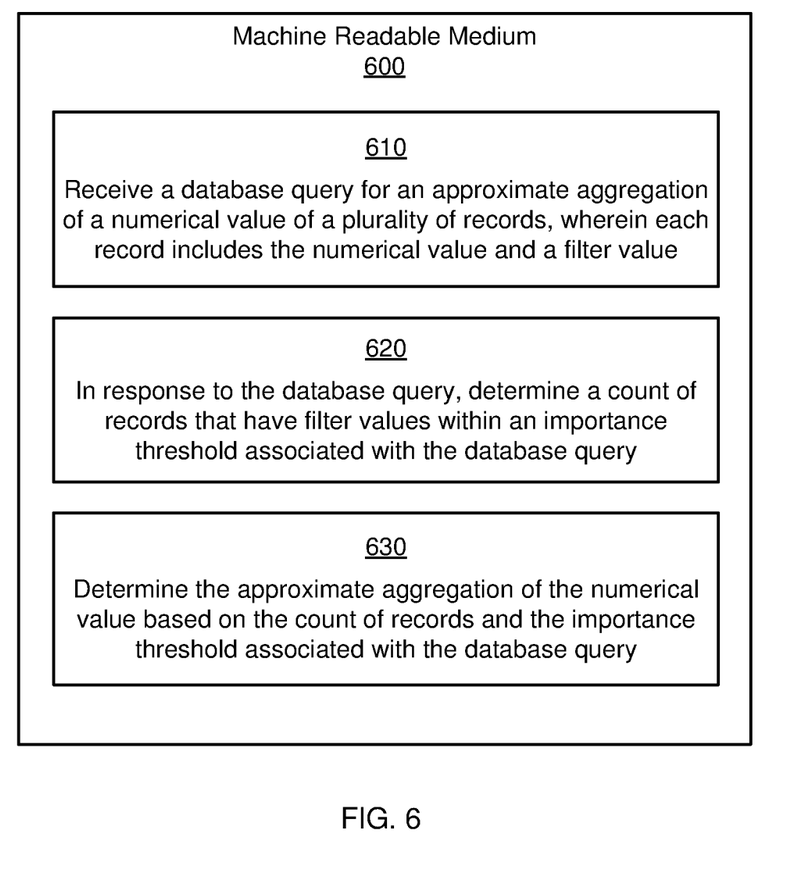
FIG. 6 is a diagram of an example machine-readable medium storing instructions in accordance with some implementations.

Referring now to FIG. 6, shown is machine-readable medium 600 storing instructions 610-630, in accordance with some implementations. The instructions 610-630 can be executed by any number of processors (e.g., the processor(s) 115 shown in FIG. 1). The machine-readable medium 600 may be a non-transitory storage medium, such as an optical, semiconductor, or magnetic storage medium.

Instruction 610 may be executed to receive a database query for an approximate aggregation of a numerical value of a plurality of records, wherein each record includes the numerical value and a filter value. For example, referring to FIGS. 1-2B, the DBMS 140 may receive the approximate aggregation query 250 to perform an estimated sum of numerical values in the "Value1" field 220 across multiple records of the table 200. Each record of the table 200 may include a "Filter" field 240 that stores a filter value for that record. In some examples, the filter values may be pre-populated prior to receiving the approximate aggregation query 250 (e.g., using the process 300 shown in FIG. 3).

Instruction 620 may be executed to, in response to receipt of the database query, determine a count of the records that have filter values within an importance threshold associated with the database query. For example, referring to FIGS. 1-2B, the approximate aggregation logic 145 may count the number of records of the table 200 that have values in the "Filter" field 240 that are less than or equal to an importance threshold specified in the approximate aggregation query 250.

Instruction 630 may be executed to determine the approximate aggregation of the numerical value based on the count of records and the importance threshold associated with the database query. For example, referring to FIGS. 1-2B, the approximate aggregation logic 145 may divide the count of records (determined at block 520) by the importance threshold, and may provide the division result as the query result 260 for the approximate aggregation query 250.

Figure 7:
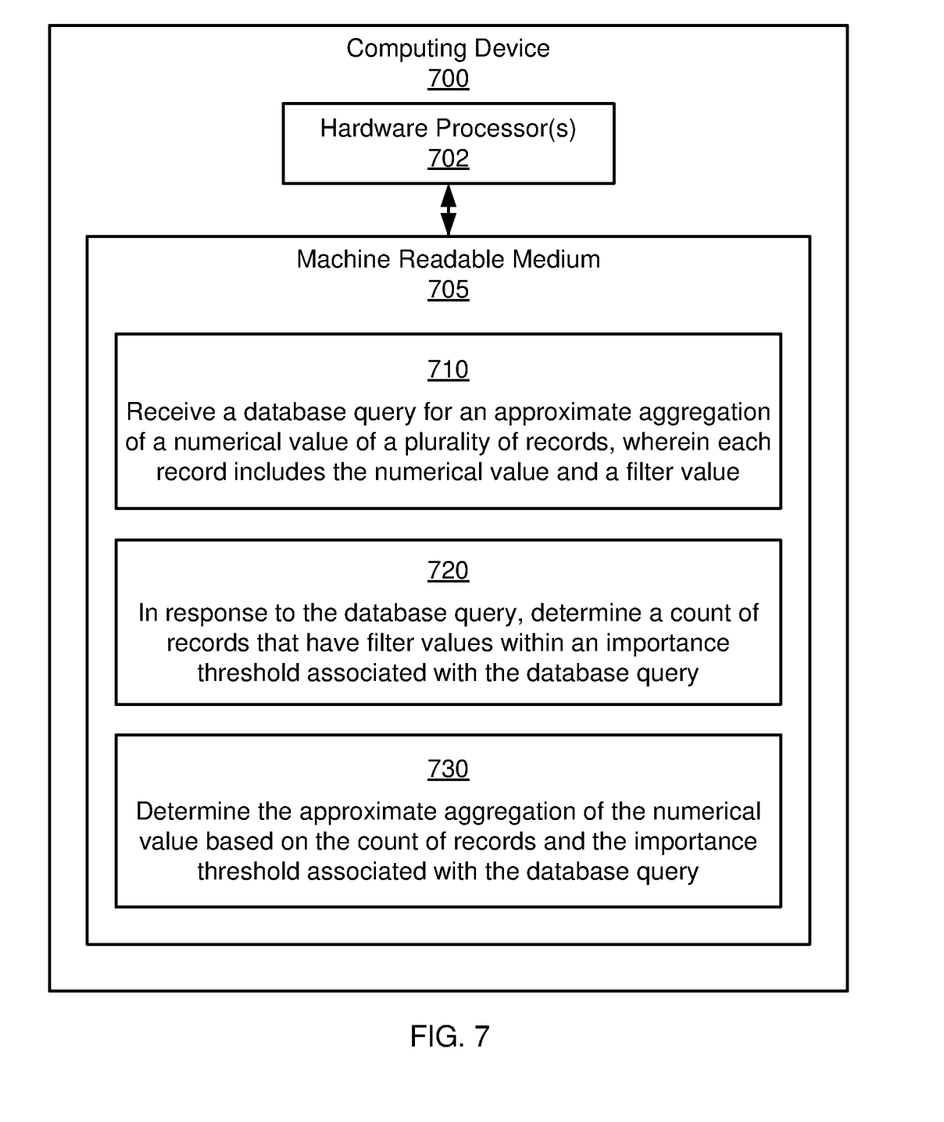
FIG. 7 is a schematic diagram of an example computing device, in accordance with some implementations.

Referring now to FIG. 7, shown is a schematic diagram of an example computing device 700. In some examples, the computing device 700 may correspond generally to the computing device 110 shown in FIG. 1. As shown, the computing device 700 may include hardware processor(s) 702 and machine-readable storage medium 705. The machine-readable storage medium 705 may be a non-transitory medium, and may store instructions 710-730. The instructions 710-730 can be executed by the hardware processor(s) 702.

Instruction 710 may be executed to receive a database query for an approximate aggregation of a numerical value of a plurality of records, wherein each record includes the numerical value and a filter value. For example, referring to FIGS. 1-2B, the DBMS 140 may receive the approximate aggregation query 250 to perform an estimated sum of numerical values in the "Value1" field 220 across multiple records of the table 200. Each record of the table 200 may include a "Filter" field 240 that stores a filter value for that record. In some examples, the filter values may be pre-populated prior to receiving the approximate aggregation query 250 (e.g., using the process 300 shown in FIG. 3).

Instruction 720 may be executed to, in response to receipt of the database query, determine a count of the records that have filter values within an importance threshold associated with the database query. For example, referring to FIGS. 1-2B, the approximate aggregation logic 145 may count the number of records of the table 200 that have values in the "Filter" field 240 that are less than or equal to an importance threshold specified in the approximate aggregation query 250.

Instruction 730 may be executed to determine the approximate aggregation of the numerical value based on the count of records and the importance threshold associated with the database query. For example, referring to FIGS. 1-2B, the approximate aggregation logic 145 may divide the count of records (determined at block 520) by the importance threshold, and may provide the division result as the query result 260 for the approximate aggregation query 250.

Note that, while FIGS. 1-7 show various examples, other implementations are contemplated. For example, referring to FIG. 1, it is contemplated that the computing device 110 may include additional components, fewer components, or different components. Further, while FIGS. 2A-2B illustrate an example table structure, implementations are not limited in this regard. Other combinations and/or variations are also possible.

In accordance with some implementations, examples are provided for improved approximate aggregation queries. In some implementations, each data record is pre-populated with a filter value that indicates the importance of that record with respect to a particular type of approximate aggregation query. When an approximate aggregation query is received, a query engine may count the number of records that have filter values less than or equal to an importance threshold, and may calculate the approximate aggregation of the numerical value by dividing the count of records by the importance threshold. This process may allow determination of the number of samples needed to get a desired error level, and may thus reduce the sample size required to achieve a desired result. Accordingly, the processing time required to execute an approximate aggregation query may be reduced in comparison to conventional techniques. Further, the approximate aggregation query may avoid errors due to "heavy tailed" and other non-inform distributions, and may thus provide improved accuracy in comparison to conventional techniques.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above.

What is claimed is:

1. A computing device comprising:
a hardware processor; and
a machine-readable storage storing instructions executable by the processor to:
receive a database query for an approximate aggregation of a numerical value of a plurality of records stored in a table, wherein the table includes a plurality of rows representing the plurality of records and a plurality of fields representing elements for each record of the plurality of records, the plurality of fields at least including a numerical value field for the numerical value and a first filter value field for a filter value;
prior to receiving the database query:
for each record of the plurality of records:
generate a random number;
divide the random number by an importance value of the record to determine the filter value of the record;
calculate a logarithm of a result of dividing the random number by the importance value to obtain a first result;
convert the logarithm to a byte data format to obtain a second result; and
store the second result in the first filter value field of the record;
in response to the database query, determine a count of records that have filter values within an importance threshold associated with the database query;
determine the approximate aggregation of the numerical value based on the count of records and the importance threshold associated with the database query; and
create an index for the table according to the first filter value field for each of the records.

2. The computing device of claim 1, the instructions executable by the processor to:
calculate the approximate aggregation of the numerical value by dividing the count of records by the importance threshold associated with the database query.

3. The computing device of claim 1, wherein the importance threshold is specified by a parameter included in the database query.

4. The computing device of claim 1, wherein the approximate aggregation of the numerical value is an approximate sum, and wherein the importance value is equal to the numerical value for each record.

5. The computing device of claim 1, wherein the first filter value field is associated with approximate sum queries, and wherein each record includes a second filter value field associated with approximate aggregation queries that are different from the approximate sum queries.

6. A non-transitory machine-readable storage medium storing instructions that upon execution cause a processor to:
receive a database query for an approximate aggregation of a numerical value of a plurality of records stored in a table, wherein the table includes a plurality of rows representing the plurality of records and a plurality of fields representing elements for each record of the plurality of records, the plurality of fields at least including a numerical value field for the numerical value and a first filter value field for a filter value;

prior to receiving the database query:
for each record of the plurality of records:
generate a random number;
divide the random number by an importance value of the record to determine the filter value of the record;
calculate a logarithm of a result of dividing the random number by the importance value to obtain a first result;
convert the logarithm to a byte data format to obtain a second result; and
store the second result in the first filter value field of the record;
in response to the database query, determine a count of records that have filter values within an importance threshold associated with the database query;
determine the approximate aggregation of the numerical value based on the count of records and the importance threshold associated with the database query; and
create an index for the table according to the first filter value field for each of the records.

7. The non-transitory machine-readable storage medium of claim 6, wherein the approximate aggregation of the numerical value is an approximate sum, and wherein the importance value is equal to the numerical value for each record.

8. The non-transitory machine-readable storage medium of claim 6, wherein the first filter value field is associated with approximate sum queries, and wherein each record includes a second filter value field associated with approximate mean queries and a third filter value field associated with approximate variance queries.

9. The non-transitory machine-readable storage medium of claim 6, wherein the instructions further cause the processor to:
calculate the approximate aggregation of the numerical value by dividing the count of records by the importance threshold associated with the database query.

10. The non-transitory machine-readable storage medium of claim 6, wherein the importance threshold is specified by a configuration setting of a database management system.

11. A computer implemented method, comprising:
receiving, by a database management system, a database query for an approximate aggregation of a numerical value of a plurality of records stored in a table, wherein the table includes a plurality of rows representing the plurality of records and a plurality of fields representing elements for each record of the plurality of records, the plurality of fields at least including a numerical value field for the numerical value and a first filter value field for a filter value;
prior to receiving the database query:
for each record of the plurality of records:
generate a random number;
divide the random number by an importance value of the record to determine the filter value of the record;
calculate a logarithm of a result of dividing the random number by the importance value to obtain a first result;
convert the logarithm to a byte data format to obtain a second result; and
store the second result in the first filter value field of the record;
in response to receipt of the database query, determining, by the database management system, a count of records that have filter values within an importance threshold associated with the database query; and
determining, by the database management system, the approximate aggregation of the numerical value based on the count of records and the importance threshold associated with the database query,
creating an index for the table according to the first filter value field for each of the records.

12. The computer implemented method of claim 11, wherein the approximate aggregation of the numerical value is an approximate sum, and wherein the importance value is equal to the numerical value for each record.

13. The computer implemented method of claim 11, wherein determining the approximate aggregation of the numerical value comprises dividing the count of records by the importance threshold associated with the database query.

14. The computer implemented method of claim 11, wherein the importance threshold is specified by a parameter included in the database query.

* * * * *